(12) United States Patent
Josefiak

(10) Patent No.: US 10,094,904 B2
(45) Date of Patent: Oct. 9, 2018

(54) METHOD FOR LOCATING A COMMUNICATION TERMINAL AND COMMUNICATION TERMINAL

(71) Applicant: Vodafone GmbH, Düsseldorf (DE)

(72) Inventor: Frank Josefiak, Bonn (DE)

(73) Assignee: Vodafone GmbH (DE)

( * ) Notice: Subject to any disclaimer, the term of this patent is extended or adjusted under 35 U.S.C. 154(b) by 240 days.

(21) Appl. No.: 14/742,396

(22) Filed: Jun. 17, 2015

(65) Prior Publication Data

US 2015/0369901 A1 Dec. 24, 2015

(30) Foreign Application Priority Data

Jun. 20, 2014 (DE) .................... 10 2014 108 658

(51) Int. Cl.
| | | |
|---|---|---|
| *G01S 5/02* | (2010.01) | |
| *H04B 17/318* | (2015.01) | |
| *G01S 5/00* | (2006.01) | |
| *H04W 64/00* | (2009.01) | |
| *H04W 76/10* | (2018.01) | |

(52) U.S. Cl.
CPC ............. *G01S 5/0257* (2013.01); *G01S 5/00* (2013.01); *H04B 17/318* (2015.01); *H04W 64/00* (2013.01); *H04W 76/10* (2018.02)

(58) Field of Classification Search
CPC ...... G06Q 10/08; G06Q 50/28; G06Q 10/083; G06Q 10/0833; G06Q 20/203; H04W 4/005; H04W 64/00; H04W 4/028; H04L 9/32
See application file for complete search history.

(56) References Cited

U.S. PATENT DOCUMENTS

| | | | |
|---|---|---|---|
| 9,020,536 B1 * | 4/2015 | Crossno | G06Q 10/0833 455/456.1 |
| 2006/0015503 A1 | 1/2006 | Simons et al. | |

(Continued)

FOREIGN PATENT DOCUMENTS

| | | |
|---|---|---|
| DE | 197 55 142 | 6/1999 |
| DE | 10142954 | 4/2003 |

(Continued)

*Primary Examiner* — Kwasi Karikari
(74) *Attorney, Agent, or Firm* — Pandiscio & Pandiscio

(57) ABSTRACT

The present invention concerns, inter alia, a method for generating location data for locating a mobile communication terminal (20) in a cellular communication network, said communication network being comprised of a number of radio cells (40, 50, 60). The basics are that the communication terminal (20) successively establishes a connection to a number of two or more radio cells (40, 50, 60) having the same and/or different field strengths, in that the communication terminal (20) maintains the connection to the respective radio cell (40, 50, 60) for a defined time period, and in that after the defined time period has elapsed, the communication terminal (20) terminates the connection to the radio cell (40, 50, 60) and establishes a connection to the next radio cell (40, 50, 60). The information items arising from this process are used on the network side to generate location data by means of which the communication terminal (20) can be located. The locating procedure is simple and inexpensive, particularly since no chargeable data connections are made.

27 Claims, 5 Drawing Sheets

(56) References Cited

U.S. PATENT DOCUMENTS

| | | | | |
|---|---|---|---|---|
| 2006/0109106 A1* | 5/2006 | Braun | ............... | G06Q 10/08 340/539.13 |
| 2008/0061963 A1* | 3/2008 | Schnitz | ............ | G06Q 10/08 340/539.13 |
| 2011/0227722 A1* | 9/2011 | Salvat, Jr. | ......... | G01S 5/0027 340/539.1 |
| 2014/0038616 A1* | 2/2014 | Burbidge | ......... | H04W 36/18 455/442 |
| 2015/0373487 A1* | 12/2015 | Miller | ............... | H04W 4/02 455/456.1 |

FOREIGN PATENT DOCUMENTS

| | | |
|---|---|---|
| DE | 103 07 592 | 9/2004 |
| DE | 10 2005 041 453 | 3/2007 |
| DE | 10 2004 025 792 | 12/2008 |
| DE | 10 2010 022 857 | 12/2011 |
| WO | WO 99/34611 | 7/1999 |

\* cited by examiner

METHOD FOR LOCATING A COMMUNICATION TERMINAL AND COMMUNICATION TERMINAL

The present invention concerns, first, methods for generating location data for locating a mobile communication terminal in a cellular communication network. The invention further concerns a method for locating a mobile communication terminal in a cellular communication network. Finally, the invention also concerns a mobile communication terminal suitable for being located in a cellular communication network.

REFERENCE TO PENDING PRIOR PATENT APPLICATION

This patent application claims benefit of German Patent Application No. 10 2014 108 658.9, filed Jun. 20, 2014, which patent application is hereby incorporated herein by reference.

FIELD OF THE INVENTION

Cellular communication networks are known, and are comprised very generally of a number of cells, each cell being assigned to a base station located at a defined location. Such cellular communication networks can be, for example, mobile radio networks.

The technical capacity to localize and thus to locate mobile communication terminals has seen rapid development in the past, and has led to a number of different services.

BACKGROUND OF THE INVENTION

The basis for the development described hereinafter is, in particular, the desire for greater logistical transparency in logistics networks and the supply chains they contain.

An essential element of every logistical supply chain is the process of changing the location of logistic goods, which is referred to as transport. In order to change locations, a distance must always be traversed. Hence, the physical size of the route is always a variable in a given transport operation. The process of changing locations takes a specific period of time that depends on the route. Thus, time, in addition to the route, is another variable in the process of transporting goods. These two variables determine the speed, which must be considered a vital characteristic for the efficiency of a supply chain in logistics.

In maritime freight logistics, goods are usually housed in containers whose outer dimensions are standardized. Such containers usually are not in the possession of the customer, supplier or logistics service provider. Instead, the containers are in the possession of the maritime shipping companies. Such containers usually must be returned once a transport request has been carried out. In this environment, more than 20 million containers are currently being moved for transport times of as much as 80 days, including incoming and outgoing inland transport. During the period of transport the containers are virtually invisible to the sender, the receiver and the logistics handlers, as well as to the owner. This means that neither the present whereabouts nor the time can be reliably ascertained, which not only gives rise to the usual problems such as ullage, loss and theft of both the goods in the containers and the containers themselves, but also, most notably, creates major disadvantages with regard to inventory management. These disadvantages involve, for example, search times for individual containers, allocation problems, demand coverage problems and lack of storage space, non-optimized warehousing costs, and a generally very high communication expenditure and associated costs in order to obtain information on the present whereabouts of the containers.

As a result, intensive efforts have been made in the past to find solutions that would eliminate these non-transparences at acceptable marginal costs. No universal solutions have been created so far, however. The solutions currently on the market are either significantly too expensive, not technologically mature, too operationally complex to install or too demanding or venturesome in terms of communication requirements, thus affecting the amount of the communication costs incurred. All present-day container tracking technologies are geared to the monitoring of freight, instead of focusing on monitoring the containers inclusive of the freight they contain. Thus far there is no simple, inexpensive, readily scalable and easy to-install variant that could be used worldwide both from a hardware standpoint and from that of communication costs.

With the establishment of cellular communication networks, new possibilities have arisen for locating communication terminals designed for communication in cellular communication networks using the resources available in those networks.

An overview of the current general state of the art is most easily approached from two angles. On the one hand, there is the hardware engineering aspect, having to do with the technical solutions embodied by the terminals that are currently on the market. On the other hand, it is also necessary to consider the locating technologies that are already available.

In the field of T&T (Tracking & Tracing) applications for container logistics, RFID systems must be ruled out precisely because of their very high global infrastructure deployment. Satellite positioning methods are used, but due to communication costs and line of sight problems, they are confined to individual routes for freight monitoring, and are not generally used to monitor the containers themselves due to their cost, their influence on position, and the energy they require. GPS/GMS or GPS/GPRS systems have seen the most widespread practical use so far: to determine a location, the installed GPS chip queries the current position and then, for example, transmits it to a server over a GSM channel as a text message or via GPRS as a TCP/IP [Transport Control Protocol/Internet Protocol] message. The cost of operation varies with the country in which the system is being used and the communication channel. If GPS cannot be used for location determination or it is necessary to save the cost of antennas and chips, the radio cell of a cellular communication network can also, alternatively, be used for locating purposes. These mobile radio network dependent locating methods use the information from the location directory and the visitor location register to identify the radio cell in which the user or the communication terminal assigned to the user is located. This technique is generally known as Cell Identification (Cell ID) or Cell of Origin (COO) positioning. This type of location determination, however, is relatively inaccurate and dependent on radio cell size. An improvement in locating accuracy can be obtained by additional field strength measurement or Received Signal Strength (RSS) indication. The location accuracies that can be achieved in this way are between approximately 200 m and 10 km, depending on the size of the radio cells.

An extension of the aforesaid locating solution provides that to determine a location, the propagation delay between the signals from at least three neighboring base stations is detected in the communication terminal and transmitted to the base station. There are already several types of methods operating on this basis that can be used for this purpose. These include, for example, Time of arrival (ToA) methods, Time Difference of Arrival (DoA) methods and Angle of Arrival (AoA) methods. To improve position accuracy, the so-called Enhanced Observed Time Difference (E-OTD) method is used in GSM networks in combination with General Packet Radio Service (GPRS). In UMTS [Universal Mobile Telecommunication Systems], the analogous method is known as the Observed Time Difference of Arrival (OT-DOA) method. It furnishes an improvement in position accuracy of 30 m to 50 m, which also has to do with the fact that a UMTS has smaller radio cells. A key element here is that the mobile communication terminal performs this calculation locally and then transmits via GSM, GPRSU/UMTS or the like. Here again, communication costs are generated through the use of a communication channel.

The general prior art also already includes indirect locating methods based on an approach similar to that of the aforesaid methods. In those methods, the measurement of at least three cell IDs is detected by the mobile communication terminal and transmitted to the provider of the cellular communication network, which, in turn, then calculates the location and transmits the results back to the communication terminal. This scheme thus actually makes use of two communication channels, since the communication terminal receives the information about its own location by that route.

WO 99/34611 A2 describes a method for tracking a mobile communication terminal in a cellular communication network. Here, the communication terminal dials into and back out of a radio cell. The radio cell in which the communication terminal was located can thus be identified. Since radio cells vary in size and can have large coverage areas of several kilometers, the known method furnishes only a very rough approximation of the location of the mobile communication terminal.

DE 10 2005 041 453 A1 discloses a method for locating a mobile terminal in a multicell radio arrangement. In this method, the central equipment initiates the location process by placing connected radio base stations in a measuring state, enabling the radio base stations to send test data to the mobile terminal that is to be located. The mobile terminal is prompted by the transmitted test data to send a response message to the radio base station, thus permitting a registration of the resultant received field strengths at the positions of the radio base stations. The measured received field strengths for the mobile terminal are then retrieved from the radio base stations by the central device, and this information can then be used to calculate location information by a triangulation method. A disadvantage of this known method is the energy consumption at the communication terminal, since energy is needed for and consumed by the existing connection.

DE 103 07 592 A1 describes a method for localizing a mobile communication terminal. For this purpose, the communication terminal sends a request message for a communication channel to a neighboring base station, which sends the mobile terminal an acknowledgement containing a time delay that is occurring, known as a TA value. This process is carried out with at least two more neighboring base stations, and the TA values obtained can thus be used to determine the position of the mobile terminal by a triangulation calculation. In this known solution, as well, test messages are transmitted between the communication terminal and a central station of the communication network, thus resulting in costs, or at the very least an increase in energy consumption.

There have been no central locating methods heretofore that permit the global positioning of an object with an accuracy of less than 200 meters without chargeable data or information transmission and with minimal power demand.

Turning now to the hardware aspect, here again, there are already a great many real-time locating systems available. Essentially, locating systems based on WLAN, RFID, NFC and the like do exist, but can be used in the container logistics sector only in certain cases, and then only in a very limited, local context. Nevertheless, a number of locating systems are already being used in the container logistics industry. These can basically be divided into satellite-supported systems and GSM/GPRS-supported systems. Whereas satellite-supported systems are used primarily on the individual shipment level, including the monitoring of temperature, humidity, shock or the like, GPS/GSM systems have come into much more widespread use. Due to their high hardware costs, however, combined with not inconsiderable communication costs, most of these known solutions have remained niche solutions that have not succeeded in gaining global acceptance.

In summary, then, there is currently no way of tracking relatively large numbers of containers in real time for long periods at low cost. One reason for this is that there are no communication and locating methods that are capable of advantageously global communication and location determination. Furthermore, there is currently no hardware on the market that would be able to perform this function at manageable cost. Due to the present situation, it is impossible for a logistics handler, shipowner or logistics customer to gain transparency in transport in a cost-effective manner.

Proceeding from the aforesaid state of the art, the object on which the invention is based is to provide solutions for locating mobile communication terminals in cellular communication networks by means of which the aforesaid disadvantages can be avoided. In particular, solutions are to be provided that offer a simple, cost-effective, readily scalable and easy to install locating capability, and with which locating can take place without chargeable data or information transmission and with minimal power demand.

SUMMARY OF THE INVENTION

This object is achieved according to the invention by the method for generating location data for locating a mobile communication terminal in a cellular communication network having the features recited in independent Claim 1, the method for generating location data for locating a mobile communication terminal in a cellular communication network having the features recited in independent Claim 9, the method for locating a mobile communication terminal in a cellular communication network having the features recited in independent Claim 17 and the communication terminal having the features recited in independent Claim 25. Additional features and details of the invention will emerge from the subclaims, the description and the drawings. Naturally, disclosures relating to individual ones of the aforesaid aspects of the invention always apply as well in connection with the other aspects of the invention and vice versa, respectively, such that the disclosure relating to one aspect of the invention must always be construed as referring in its entire content and scope to the disclosure of the other aspects of the invention and vice versa, respectively.

The present invention, as reflected in the various aspects of the invention, is based on the fundamental realization that the object is achieved both by means of a new locating method and by the use of a new hardware solution.

The locating method according to the invention and the communication terminal according to the invention, which are described in detail below, can preferably be used to locate moving objects. It is preferably provided, for this purpose, that a communication terminal according to the invention is placed in connection with a moving object, for example by being attached, preferably irremovably, to the moving object.

The invention is not limited to specific types of moving objects. The invention can, in principle, be used with any type of moving object. Such moving objects can be, for example, containers, trailers, semi-trailers, trucks, ships, aircraft, but also individual shipments, boxes, pallets, crates, even letters, and the like, it being noted that the present invention is not limited to the aforesaid areas of application. To clarify the relationships according to the invention, the present invention will often be described below in connection with its application to containers. It will be clear to the skilled person, however, that the technology on which the present invention is based can also be used in other fields of application, and thus that the present invention is not limited to the cited field of application.

The present invention provides, in particular, an M2M (machine to machine) solution, with which the existing moving objects, for example containers, particularly also relatively large to large container parks, can be fitted and especially retrofitted in a simple and cost-effective manner. For this purpose, the moving objects, for example the containers, need only be equipped with suitable communication terminals. Higher transparency and security in the locating and tracking of moving objects, for example containers, can be achieved by means of the present invention.

The inventive concept as a whole is composed of two subareas. In addition to new, alternative tracking hardware in the form of a communication terminal, a novel locating method is also an essential component of the present invention.

All the methods of the various aspects of the invention preferably take place automatically.

The individual components necessary for the performance of the methods can be designed or configured as electronic components, electrical circuits or, alternatively, as software components. This also applies to the individual components of the communication terminal according to the invention. Components that are configured as software-based in the communication terminal can preferably be parts of the firmware of the communication terminal or can, alternatively, be implemented or embedded in the firmware.

The term "firmware" is to be understood in general here as signifying a software that is embedded in the communication terminal and thus is fixedly functionally associated with the communication terminal. This means that the one cannot be used without the other. The firmware thus occupies an intermediate position between the physical components of the communication terminal, which can be designated as hardware, and the application software on the communication terminal.

All the inventive aspects of the present invention are based in common on the fundamental technical idea that the communication terminal successively establishes a connection to a number of two or more radio cells having the same or different field strengths, that the communication terminal maintains the connection to the particular radio cell for a defined time period, and that after the defined time period has elapsed, the communication terminal terminates the connection to the radio cell and establishes a connection to the next radio cell. This represents the foundation for the location data on which the subsequent locating of the communication terminal is based.

The invention is not, in principle, limited to specific types of connection establishment. The establishment of a connection is intended in particular to mean that the communication terminal enters into contact with the radio cell, particularly with the base station responsible for the radio cell. In particular, connection establishment by the communication terminal to the radio cell proceeds only so far that no chargeable data or information transmission arises, is engaged in and takes place.

It is provided according to the invention that the communication terminal establishes the connection to the radio cell, then maintains this connection for a set time period and, after the lapse of this set time period, then terminates, i.e. breaks, the connection. It is particularly provided in this regard that the duration of the connection should be calculated as so short that no chargeable data or information transmission takes place during the connection.

This will be explained on the basis of a preferred exemplary embodiment. When a communication terminal, for example a mobile phone, enters into contact with a radio cell, particularly with the base station responsible for the radio cell, the parameters for the subsequent, actual data or information transmission are first negotiated, in an initial phase. This process, familiar to those skilled in the art as "handshaking," is not yet chargeable and usually lasts only a short time. The time period for which the communication terminal maintains the connection to the radio cell is preferably calculated as less than or equal to the duration of the aforesaid process, thus ensuring that in any case, no chargeable data or information transmission will have yet taken place. For example, connection establishment can also be understood to mean that the communication terminal dials into a radio cell. Termination of the connection would then mean that the communication terminal dials back out of said radio cell. Such a dialing-in process, however, proceeds only so far that no chargeable data or information transmission has yet arisen, been engaged in and taken place.

The actual locating of the communication terminal under these conditions does not take place within the communication terminal, thus being performed by the communication terminal itself, but rather on the network side, particularly centrally, by the operator of the cellular communication network. The method is not limited to operation within just one communication network. It can also be made to span communication networks of different operators, in which case the individual communication networks are preferably the same type of network. For example, in the case of a plurality of communication networks, all the networks can be mobile radio networks.

In this scheme, no chargeable data or speech connection to the cellular communication network is needed by the communication terminal, so no communication costs arise, which also has a positive effect on the energy consumption of the communication terminal. No locating costs are incurred, for example through the use of a GPS chip, the payment of royalties or the like, nor are there any communication costs, owing to the elimination of chargeable data and information transmission.

According to the first aspect of the invention, a method is provided for generating location data for locating a mobile communication terminal in a cellular communication network, said communication network being comprised of a number of radio cells, which method is characterized in that the communication terminal successively establishes a connection to a number of two or more radio cells having the same and/or different field strengths, in that the communication terminal maintains the connection to the particular radio cell for a defined time period, and in that after the defined time period has elapsed, the communication terminal terminates the connection to the radio cell and establishes a connection to the next radio cell.

This method according to the first aspect of the invention is carried out by the communication terminal.

The method is directed to the generation of location data. This means that this method is used so that location data can be created. This does not necessarily mean that such location data must be the direct result of the method. The method can also be indirectly involved in the generation or creation of location data, for instance if the data generated by the method still have to be undergo further processing in further steps until the finished location data are finally obtained. That is, the generation of location data according to the first aspect of the present invention also includes the possibility of thereby creating the prerequisites for ultimately generating location data.

The location data to be generated serve to locate a mobile communication terminal. This means that the location data must be suitable for use as the basis for the performance of a locating method. Locating the communication terminal particularly represents determining the place where the communication terminal is located in the communication network at the point in time when its location is determined. Locating the communication terminal can thus also be referred to as localizing the communication terminal.

The method takes place in a cellular communication network, said communication network being comprised of a number of radio cells. Such a cellular communication network is preferably a mobile radio network. The communication terminals to be located are preferably terminals designed for use in the relevant communication network, for example mobile radio terminals, such as mobile phones. In such a case, the devices in question can preferably be very simple mobile phones that will be described in more detail below in connection with the communication terminal according to the invention, and consequently these statements made subsequently hereinbelow are fully incorporated here by reference and the reader is referred thereto.

A cellular communication network is very generally characterized particularly by the fact that it comprises a multiplicity of communication cells in the form of radio cells, each having at least one base station for wireless communication with a multiplicity of communication terminals. Each communication cell is assigned to a base station. That is, each communication cell is served by a base station, which functions both as a transmitting and a receiving station. The communication terminals do not communicate with one another directly, but instead via mobile radio antennas, each of which is part of a respective base station. A connection is established as a result of the transmission by the communication terminal of a radio signal, in the form of electromagnetic waves, to the nearest mobile radio antenna. Any chargeable transmission of data and information must be preceded, in particular, by a so-called handshaking process, in which the parameters for the subsequent chargeable communication are negotiated.

A radio cell of a cellular communication network is, in general, the region in which the signal transmitted by a transmitting device of the communication network, for example of the mobile radio network, can be received and decoded without error. Each radio cell has a radio cell ID, also referred to as the cell ID. The size of a radio cell is dependent on meteorological and geographical conditions, the type of antennas used and their installation height, the transmission power, and the mobile radio standard used. The size of the cells can range from a few meters to a few kilometers, for example up to 35 km. Neighboring radio cells normally overlap, regardless of the standard. The reasons for this are particularly as follows: terminals that do not have an active connection to the network should be given the opportunity to choose a new cell if service is deteriorating. Terminals that do have an active connection to the network can be assigned by the network to a new cell for further communication without interrupting the communication process.

It is provided according to the invention that the communication terminal successively establishes a connection to a number of two or more radio cells having the same and/or different field strengths.

The field strength of a radio call depends particularly essentially on the transmission power and transmission characteristic of the antenna and decreases rapidly with increasing distance. The field strength of the radio cell is, in particular, the field strength at which the communication terminal receives signals from the radio cell or from the base station responsible for the radio cell.

The different field strengths of the radio cells are, in particular, related to the current location of the communication terminal. At that location, the communication terminal normally has access to more than one radio cell. On the one hand, it has access to the radio cell in which it is actually located. It also, however, has access to neighboring radio cells. The communication terminal can thus connect to base stations of different radio cells. As described above, not all radio cells have the same field strength relative to the communication terminal.

The communication terminal establishes a connection to the radio cells. This means, in particular, that a connection is established to the base station of the particular radio cell. It is provided in particular, here, that during the connection to the particular radio cells, no chargeable data or information transmission is yet engaged in and takes place.

It is now provided according to the invention that the communication terminal establishes a connection not just to a single radio cell, but to a number of radio cells in succession, the invention not being limited to a specific number of radio cells. Preferred exemplary embodiments hereof will be described in more detail subsequently hereinbelow.

As to the matter of connection establishment, standard procedures can be used that exist in the communication network and are described in the relevant communication network specifications, for example in the mobile radio network specifications, and which are familiar to those skilled in the art.

After a connection is established, the communication terminal maintains the connection to the particular radio cell for a defined time period. The invention is not limited in this regard to specific connection durations. Preferred embodiments in this regard will be described in more detail subsequently hereinbelow.

After the defined time period has elapsed, the communication terminal terminates the connection to the radio cell. The communication terminal then immediately establishes the connection to the next radio cell. The termination of a connection to a radio cell causes the connection of the communication terminal to the radio cell to be severed. Such connection establishment and connection termination can in particular take place or be performed via the firmware present in the communication terminal.

On establishing a connection to a radio cell or during the duration of the connection, the communication terminal can preferably transmit an identifier of the communication device. In principle, the invention is not limited to certain identifiers in this regard. All that matters is that it be possible to characterize or identify the communication terminal unambiguously by means of the identifier. If the communication terminal is a mobile phone and the communication network is a mobile radio network, such an identifier can be, for example, an MSISDN (Mobile Subscriber Integrated Services Digital Network Number), a SIM ID or the like. This will be explained in more detail later on in the description.

In a preferred embodiment, the method can be characterized by the following steps:
a) the communication terminal is in a ready mode;
b) after the lapse of a time interval, i.e., particularly at the end of the time interval set in a clock unit provided in the communication terminal, the communication terminal receives a trigger signal from the clock unit and switches from ready mode into operating mode;
c) in operating mode, the communication terminal successively establishes—particularly via a communication module provided in the communication terminal—a connection to a number of two or more radio cells having different field strengths, and maintains the connection to the particular radio cell for the defined time period;
d) after the defined time period has elapsed, the communication terminal terminates the connection to the radio cell and establishes a connection to the next radio cell;
e) after termination of the connection to the last radio ell, the communication terminal switches from operating mode back into ready mode and remains in ready mode until the next time interval has elapsed.

This time interval is particularly designed to be recurrent. That is to say, whenever the time interval elapses, it begins to run over again.

A time interval in this context is generally a more or less broad portion of time in the form of a time gap, time segment, time span, time space, time phase, time period or the like. A time interval has a beginning and an end.

In the aforesaid embodiment, the communication terminal has a clock unit, which can also be referred to as a timer. The term "clock unit" refers here in particular to a control component that is used to perform an extremely wide variety of time-related functions. Such clock units can be implemented as software or as hardware, in the form of an electronic circuit, and are familiar per se to those skilled in the art.

After the time interval has elapsed, i.e., at the end of the time interval, the communication terminal receives a trigger signal. The lapse of the time interval here represents a triggering result, in response to which the communication terminal receives a pulse in the form of a signal, the trigger signal, that brings about a switching operation. In the present case, after receiving the trigger signal the communication terminal switches from a ready mode into an operating mode.

The ready mode, which can also be referred to as standby mode or idle mode, is, in particular, the state of the communication terminal in which the actual network function is temporarily deactivated, but can be reactivated at any time and without preparations or relatively long wait times. Maintaining the ready state usually entails a specific power demand that is lower than that of normal operation. As soon as the communication terminal is in use, for instance due to its having received a trigger signal, the communication terminal is shifted into operating mode, in which it perform its functions as intended.

After termination of the connection to the last radio cell, the communication terminal switches, preferably automatically, out of operating mode back into ready mode. This can be the case, for example, if no more radio cells can be reached, or alternatively if a prescribed number of radio cells to which the communication terminal is to establish a connection, and thus a prescribed repetition of connection establishment procedures, has been attained.

If the communication terminal is switched back into ready mode, it remains in ready mode until the time interval elapses again, that is, until the next time interval runs out.

In a preferred embodiment, it is provided that the communication terminal initially establishes a connection to a first radio cell having the highest field strength, particularly in relation to the communication terminal at its current location, that after the defined time period has elapsed the communication terminal terminates the connection to the first radio cell, and that the communication terminal then establishes a connection to at least one other radio cell whose field strength is the same as and/or weaker than that of the first radio cell.

For example, it can be provided that the communication terminal successively establishes a connection to a number of three or more, preferably to up to nine, radio cells of different field strengths. In principle, the invention is not limited to a specific number of radio cells into which it can dial. It is particularly the case that as many radio cells as possible are to be included in the method. The greater the number of radio cells included, the more precisely the location of the communication terminal can be determined, as will be described in detail below in connection with the other aspects of the invention.

For purposes of clarification, an example will now be described in which the communication terminal successively establishes a connection to three radio cells.

The communication terminal first establishes a connection to a first radio cell, which is the strongest radio cell, that is, the radio cell having the highest field strength, particularly from the point of view of the current location of the communication terminal. After a defined time period for which the communication terminal maintains the connection to the first radio cell, the communication terminal terminates the connection to the first radio cell. Immediately thereafter, the communication terminal sets up a connection to a second radio cell, which is different from the first radio cell and is equally strong as or weaker than the first radio cell, i.e., is a radio cell having the same or a weaker field strength. After a defined time period during which the communication terminal maintains the connection to the second radio cell, the communication terminal terminates the connection to the second radio cell. Immediately thereafter, the communication terminal establishes a connection to a third radio cell, which is different from the first and second radio cells and is equally strong as or weaker than the first and also the second radio cell, i.e., a radio cell having the same or a weaker field strength. After a defined time period during which the communication terminal remains connected to the third radio cell, the communication terminal terminates the connection to the third radio cell and is switched back into ready mode.

If a connection establishment to more than three radio cells is taking place, the method repeats itself as many times as a connection to radio cells is to be established. It is preferably provided in this case that a radio cell to which the communication terminal establishes a connection is always a radio cell that is as strong as or weaker than the preceding radio cell, i.e., a radio cell having the same or a weaker field strength. After the connection to the last radio cell is terminated, it is—particularly always—provided that the communication terminal is switched out of operating mode and back into ready mode.

In preferred embodiment, it is provided that the time interval after the lapse of which the communication terminal switches out of the ready mode into an operating mode is on the order of one or more hours or on the order of one or more days. The size of the time interval is calculated in particular according to the time for which and/or the speed at which the communication terminal is traveling within the cellular communication network. If the method is used in connection with the locating of containers, the time interval can be, for example, 24 hours. This means that every 24 hours, the communication terminal disposed on a corresponding container switches from ready mode into operating mode and carries out the above-delineated procedures of dialing into the different radio cells.

It is preferably provided that the communication terminal maintains the connection to a radio cell for the defined time period of between 0.5 and 15 seconds, preferably between 2 and 10 seconds, preferably between 4 and 7 seconds, particularly preferably of 5 seconds. The invention is not, in principle, limited to specific time periods. All that matters is that the time periods be calculated as so short that the successively occurring procedures of establishing connections to the different radio cells are performed as close together in time and in as tight a sequence as possible, and that no chargeable data or information transmission takes place during the connection. The time periods are limited at the low end, in terms of systems engineering, by the fact that enough time has to remain for the communication terminal to be able to establish the connection to a radio cell. In particular, the defined time periods should also be short enough so that the communication terminal can carry out the intended procedures of establishing connections to the different radio cells without its location changing significantly, which would bring about in a change in the field strength of individual radio cells relative to the communication terminal.

The method is preferably performed while the communication terminal is in a stationary state. In this context, "stationary" means in particular that the communication terminal is standing still or nearly standing still while the method is being performed. A stationary state should also be construed to mean that the communication terminal is moving so slowly compared to the overall duration of the dialing procedures that its movement has no adverse effect on the method.

The method as described above according to the first aspect of the invention can also, in particular, be described supplementarily as follows.

A time interval within which the communication terminal, for example a simple mobile phone, is intended to "wake up" from ready mode, for instance standby mode, is set on the clock, for example a timer, that is already integrated into the communication terminal. After waking up, the communication terminal establishes a connection to the strongest radio cell of any given provider according to the standard, for example the GSM standard in the case of a mobile radio network, and correspondingly terminates the connection after 5 seconds in the "connection established" state. The communication terminal will then, for example by means of its firmware, disconnect from the radio cell and immediately establish a connection to the second-strongest cell, again remain reachable there for 5 seconds and then disconnect again. This process should take place at least 3 times and, when a plurality of radio cells is available, as often as possible, for example up to 9 times. If either no more radio cells can be detected or the number of radio cells to be addressed has been reached, the communication terminal terminates the connection and goes back into ready mode, in which it remains until the internal clock runs out again. In this way a locating interval can be set in a simple manner, and, given a time interval of 24 hours, for example, the energy consumption of the communication terminal could be reduced to an absolute minimum.

According to a second aspect of the invention, a method is provided for generating location data for locating a mobile communication terminal in a cellular communication network, said communication network being comprised of a number of radio cells and each radio cell being assigned to a base station located at a defined location, which method is characterized in that connection establishment procedures performed by a communication terminal to connect to a number of two or more radio cells having the same and/or different field strengths are detected successively on the network side, in that after the establishment of a connection to a radio cell, an identifier of the communication terminal establishing the connection is linked on the network side to a radio cell ID of the radio cell, in that at the instant of connection establishment and/or connection termination by the communication terminal to a radio cell, a time stamp is generated that is linked to the identifier of the communication terminal and to the radio cell ID to form location data, and in that the location data are stored in a central database on the network side.

The method of the second aspect of the invention takes place particularly on the network side. This means that the method is performed by the operator of the communication network. In so doing, the network operator particularly obtains data that derive from the connection establishment procedures of the communication terminal and were acquired in particular by the method according to the first aspect of the invention, and consequently, in this regard, to avoid repetition in the disclosure, the statements regarding the first aspect of the invention are fully incorporated here by reference and the reader is referred thereto.

According to the method of the second aspect of the invention, connection establishment procedures performed by a communication terminal to connect to a number of two or more radio cells having the same and/or different field strengths are detected successively on the network side. When the communication terminal has established a connection to a ratio cell, the communication network receives an identifier of the communication terminal, which is transmitted by the communication terminal to the radio cell of the communication network to which the communication terminal is establishing the connection. If the communication terminal is a mobile phone and the communication network is a mobile radio network, such an identifier can be, for example, an MSISDN (Mobile Subscriber Integrated Services Digital Network Number), a SIM ID or the like. This will be explained in more detail later on in the description.

After the communication terminal has established a connection to the radio cell, an identifier of the communication terminal establishing the connection is linked on the network side to a radio cell ID of the radio cell concerned. In addition, at the instant of connection establishment and/or connection termination by the communication terminal to a radio cell, a time stamp is generated that is linked to the identifier of the communication terminal and to the radio cell ID to form location data. The location data are then stored in a central database on the network side.

Analogously to the corresponding statements regarding the first aspect of the invention, which are fully incorporated here by reference and to which the reader is referred, the connection establishment procedures performed by the communication terminal to connect to the two or more radio cells having the same and/or different field strengths are preferably detected at defined time intervals, said defined time interval particularly being between 0.5 and 15 seconds, preferably between 2 and 10 seconds, preferably between 4 and 7 seconds, and particularly preferably being equal to 5 seconds.

Analogously to the corresponding statements regarding the first aspect of the invention, which are fully incorporated here by reference and to which the reader is referred, on the network side, a connection establishment procedure performed by the communication terminal to connect to a first radio cell having the highest field strength is preferably first detected. A connection establishment procedure performed by the communication terminal to connect to at least one additional radio cell whose field strength is equally strong as or weaker than that of the first radio cell is then detected.

Analogously to the corresponding statements regarding the first aspect of the invention, which are fully incorporated here by reference and to which the reader is referred, connection establishment procedures performed by a communication terminal to connect to a number of three or more, preferably to up to nine, radio cells of different field strengths are successively detected.

It is preferably provided that the communication terminal, using a method as described above according to the first aspect of the invention, successively establishes a connection to a number of two or more radio cells of different field strengths and that these connection establishment procedures are detected on the network side. In this case, the communication terminals by means of which the connection establishment to the radio cells takes place become an element of the method, said communication terminals interacting with corresponding counterpart stations in the communication network. The corresponding statements regarding the first aspect of the invention thus are fully incorporated here by reference and the reader is referred thereto.

In further embodiment, it is preferably provided that the radio cell IDs of the individual radio cells are linked to geographical position data, particularly to latitude and longitude readings. The geographical position can then be determined from the radio cell IDs. Such readings are usually in the possession of the network operator, particularly if the communication network is a mobile radio network. In this case, the geographical position characterizing a radio cell can preferably be based on the position of the base station responsible for the radio cell.

In further embodiment, values relating to the field strength of a radio cell at the instant of connection establishment by the communication terminal to that radio cell can preferably be detected. Such values can be measured by performing a field strength measurement. Such readings are also usually in the possession of the network operator, particularly if the communication network is a mobile radio network.

In preferred embodiment, the location data can be stored on the network side in a central database configured as a central APN register. Such an APN register will be described in more detail in the subsequent course of the description.

The method as described above according to the second aspect of the invention can also, in particular, be described supplementarily as follows.

The location determination per se is accomplished in particular by the expedient of the network operator, on the network side, accessing the central database, for example the central APN register. If the communication network is a mobile radio network, the identifiers of the communication terminals, for example the MSISNs of individual communication terminals, are deposited in the central database with the radio cell IDs and a date stamp. The network operator is thus able to dial a communication terminal that is actively registered in a cell. Since each radio cell ID is linked to latitude and longitude readings, also known as lat-long values, and the geographical location of the radio cell is therefore precisely known, this information can be used to obtain a still very imprecise, initial location information item. This is usually still too imprecise, however, since an individual radio cell can represent a radius of as much as 35 km. Nevertheless, utilizing the modified firmware in the communication terminal and its novel connection establishment behavior, the next radio cell ID value can now be retrieved from the central database and a second location information item can thus be added to the first. From the two cell points, combined with knowledge of the transmission power of the base station, which is also available as central information on the network side, an overlapping region can now be identified. If this process can be repeated a number of times, since there is more than one radio cell to which the communication terminal is establishing a connection at short time intervals, for example at 5-second intervals, the relevant area of overlap can be progressively reduced in size, thus progressively increasing the quality of the location determination and, in the ideal case, narrowing it down to a few meters.

According to a third aspect of the invention, a method is provided for locating a mobile communication terminal in a cellular communication network, said communication network being comprised of a number of cells and each cell being assigned to a base station located at a defined location, which method is characterized in that the locating of the communication terminal takes place on the network side by means of a locating device in such manner that the locating device accesses a central database of the communication network, in which central database the location data are stored in the form of identifiers of communication terminals establishing a connection to radio cells of the communication network, which are linked to radio cell IDs of the radio cell dialed into and to a time stamp at the instant of connection establishment and/or connection termination by the communication terminal to a radio cell, in that the location data for a communication terminal having a predefined identifier are used to determine radio cell IDs for which the time stamps fall within a defined timeframe, and in that the determined radio cell IDs are used to determine the position of the communication terminal.

In contrast to the solutions known from the prior art, in which the locating of a communication terminal takes place in the communication terminal, locating by the method according to the invention now takes place on the network side. For this purpose, the network comprises a locating device, which can be, for example, a computer unit assigned to the network. In order to perform the locating method, this locating device accesses a central database of the communication network, in which central database the location data relating to the communication terminal to be located are stored.

These location data can be constituted in the manner described earlier above with reference to the second aspect of the invention, and consequently, in this regard, the corresponding statements made earlier hereinabove are fully incorporated here by reference and the reader is referred thereto. In particular, location data are stored in the central database in the form of identifiers of communication terminals establishing a connection to radio cells of the communication network, which are linked to radio cell IDs of the radio cells dialed into and to a time stamp at the instant of connection establishment and/or connection termination by the communication terminal to a radio cell.

To be able to locate a given communication terminal having a specific identifier, that predefined identifier is used by the locating device of the communication network to determine, from the location data, radio cells where the time stamps fall within a defined timeframe. As described earlier hereinabove, the successive connection establishment procedures by which the communication terminals connect to the different radio cells having the same and/or different field strengths take place for defined time periods in the range of seconds in the "existing connection" state, and consequently the corresponding establishments of connections to the different radio cells occur at short time intervals and thus very close together in time. Given a number of connection establishments of a communication terminal to different radio cells that are made close together in time, it can therefore be assumed that these can be used for a single locating process. The respective time stamp linked to the data is important so as to be able check this assumption.

Finally, the radio cell IDs that have been determined are used to determine the position of the communication terminal. A more detailed account of how this can take place will be furnished below. Basically, the geographical position of a radio cell, for example the geographical position of the base station responsible for the radio cell, can be determined from the radio cell IDs. Suitable readings are usually available to the network operators.

The location data stored in the central database preferably can be generated or can have been generated by a method according to the invention as described hereinabove in accordance with the first and second aspects of the invention, and thus, to avoid repetition, the relevant statements made earlier hereinabove are fully incorporated here by reference and the reader is referred thereto.

The locating device preferably accesses a central database of the communication network, which central database is configured as a central APN register. Such an APN register will be described in greater detail subsequently hereinbelow.

Analogously to the defined time periods for which a communication terminal remains connected to a radio cell, in regard to which the relevant disclosures made earlier hereinabove are fully incorporated here and to which the reader is referred, for the communication terminal having a predefined identifier, radio cell IDs are preferably determined for which the time stamps fall within a defined timeframe of less than 2 minutes, preferably within a timeframe of between 6 and 90 seconds, particularly preferably between 15 and 45 seconds. The timeframe in this case is measured particularly on the basis of the defined time period for which a communication terminal remains connected to a radio cell, and from the number of radio cells to which the communication terminal establishes a connection during a method for generating location data. In such a case, the timeframe can be obtained, for example, by adding together the defined time periods for each radio cell, up to the total number of radio cells with which the communication terminal establishes a connection.

There follows a description of some preferred exemplary embodiments of how the location of the communication terminal can ultimately be obtained from the determined radio cell IDs.

Preferably, it is provided that the location data for the communication terminal having a predefined identifier are first used to determine a radio cell ID of a first radio cell, particularly the radio cell with the highest field strength, and that from this are generated first location information items relating to the communication terminal, that the radio cell ID of at least one additional radio cell, particularly a radio cell whose field strength is equal to or less than that of the first radio cell, is then determined, and that from this are generated second location information items relating to the communication terminal, and that the second location information items are added to the first location information items.

In further embodiment, it is preferably provided that the locating device accesses a central database of the communication network, in which central database are deposited the location data generated by the establishment of a connection by a communication terminal to a number of two or more radio cells of equal and/or different field strengths, that the communication terminal maintains the connection to the corresponding radio cell for a defined time period, that after the defined time period has elapsed, the communication terminal terminates the connection to the corresponding radio cell and establishes a connection to the next radio cell, in that after the establishment of a connection to a radio cell, an identifier of the communication terminal establishing the connection is linked, particularly on the network side, to a radio cell ID of the radio cell to which the communication terminal is establishing the connection, that at the instant of connection establishment and/or connection termination by the communication terminal to the radio cell, a time stamp is generated, which is linked to the identifier of the communication terminal and to the radio cell ID to form location data, that the location data of a first radio cell are used to generate first location information items relating to the communication terminal, and that at least one additional location information item relating to the communication terminal is generated from the location data of at least one additional radio cell and is added to the first location information item.

From the combined location information items relating to the communication terminal, in a preferred embodiment an overlapping region is identified or determined, the position of the communication terminal being located in the overlap region.

It is preferably provided that the location frequency of a communication terminal is on the order of one of more hours or on the order of one or more days. The location frequency can preferably be on the order of 24 hours. This means that the location of the communication terminal is determined once every 24 hours. For this purpose, as described earlier hereinabove, the communication terminal is switched from ready mode into operating mode once every 24 hours. In operating mode, the communication terminal then performs the connection establishment procedures to connect to the different radio cells having the same and/or different field strengths. From the location data deriving from these connection establishment processes, the location information items are then determined. If the process is terminated the communication terminal is shifted back into ready mode, in which it remains until its next activation, after another 24 hours.

The locating method according to the invention accesses a central database, for example the global APN register, in order to determine the location of the communication terminal, said communication terminal being designed so that it is capable, preferably while not moving or while moving only very slowly, of successively establishing a connection to the radio cells that are available at its location. During this operation, the identifiers of the communication terminals are paired with the radio cell IDs, which can be retrieved from the central database. The radio cell IDs are linked to geographical latitude and longitude readings. Since the communication terminal establishes a connection to a plurality of radio cells, the precise location of the communication terminal can be determined in this way.

It is particularly advantageous in this context that the communication terminal establishes no chargeable data or voice connection to the communication network. Furthermore, the location of the communication terminal can be determined with minimal energy consumption. The communication terminal can thus attain a very long service life or life cycle.

There now follows a description of a communication terminal by means of which the above-described location data can be generated and whose location can be determined in the above-described manner.

According to a fourth aspect of the present invention, a communication terminal is provided for communication in a cellular communication network comprising a number of radio cells, said communication terminal comprising a device for generating electrical energy, a case, and a communication module for establishing a connection of the communication terminal to the radio cells of the communication network. The communication terminal is characterized in that it comprises a connection establishing device designed to enable the communication terminal to successively establish a connection to a number of two or more radio cells of the same and/or different field strengths, in that the communication terminal maintains the connection to the corresponding radio cell for a defined time period, and in that after the defined time period has elapsed, the communication terminal terminates the connection to the corresponding radio cell and establishes a connection to the next radio cell.

The communication terminal is designed for communication in a cellular communication network comprising a number of radio cells. In principle, the present invention is not limited to certain types of communication terminals. If the communication network is a mobile radio network, the communication terminal can be embodied, for example, as a mobile phone. In that case, the communication terminal can be embodied, for example, as a very simple mobile phone from which a few otherwise customary components have also been removed. The communication terminal can thus be produced in a particularly cost-effective manner. For example, the standard SIM slot would be replaced by an embedded global SIM card. The display, speaker, keyboard, backlight and internal memory could be removed.

The communication terminal comprises a device for generating electrical energy. The invention is not limited to specific embodiments of such devices. So that the communication terminal can be used as independently as possible, it is preferably provided that the device for generating electrical energy includes at least one solar module. Additionally or alternatively, it can be provided that the device for generating electrical energy includes a device for storing electrical energy, particularly a storage battery.

The communication terminal also has a case. This case should be as robust as possible and should keep out external negative influences. It is preferably a fully encapsulating case, which is hermetically sealed and is, in particular, water-tight and dust-tight.

The communication terminal also comprises a communication module for establishing a connection to the radio cells of the communication network. Such a communication module can be embodied in different ways, depending on the type of communication network. If the communication network is a mobile radio network, the communication module can be, for example, a GSM module or the like.

A preferred exemplary embodiment of such a communication terminal will now be described. The embodiment assumes a conventional GSM/GPRS-based system. An above-average service life is obtained with such a system, primarily through the use of a solar module in the form of a multicrystalline solar cell combined with an internal lithium/polymer storage battery, and handling expenditure is thus kept to a minimum. The storage battery is housed in the main unit of the device. Also in the main unit are the charging electronics, which control the charging of the storage battery by the solar module, and the GSM module, consisting of a 3G modem and an antenna for transmitting messages. A fully encapsulating case is also provided.

According to the invention, the communication terminal comprises a connection establishing device designed such that the communication terminal successively establishes a connection to a number of two or more radio cells of the same and/or different field strengths, that the communication terminal maintains the connection to the corresponding radio cell for a defined time period, and that after the defined time period has elapsed, the communication terminal terminates the connection to the corresponding radio cell and establishes a connection to the next radio cell. This connection establishing device is designed particularly to perform the inventive method according to the first aspect of the invention, and consequently, with regard to the disclosure of the dialing device, the relevant statements made earlier hereinabove are fully incorporated here and the reader is referred thereto. For example, such a connection establishing device can be an electric component or an electric circuit. Preferably, however, the connection establishing device is a software component that is part of the firmware of the communication terminal.

In further embodiment, the communication terminal preferably comprises a clock unit. Such a clock unit can be, for example, an electric component or an electric circuit. Preferably, however, the clock unit is a software component that is part of the firmware of the communication terminal. The clock unit is set to a time interval after the lapse of which the communication terminal switches in each case from a ready mode into an operating mode. The clock unit also has a triggering device for generating a trigger signal at the end of the time interval, in response to which the communication terminal switches from ready mode into operating mode. This clock unit is designed in particular for use with the inventive method according to the first aspect of the invention, and consequently, with regard to the disclosure of the clock unit, the relevant statements made earlier hereinabove are also fully incorporated here and the reader is referred thereto.

In further embodiment, the communication terminal preferably comprises a switching device for switching the communication terminal from operating mode back into ready mode after the communication terminal has dialed out of the last radio cell. Such a switching device can be, for example, an electric component or an electric circuit or a software component. This switching device is designed particularly for use with the inventive method according to the first aspect of the invention, and consequently, with regard to the disclosure of the switching device, the relevant statements made earlier hereinabove are also fully incorporated here and the reader is referred thereto.

The communication terminal preferably comprises means for carrying out the inventive method according to the first aspect of the invention, and consequently, in this regard, the relevant statements made earlier hereinabove are fully incorporated here and the reader is referred thereto.

The communication terminal preferably comprises a fastening device for fastening the communication terminal to an external element. The invention is not limited to specific types of fastening devices. The fastening device in this context can be, for example, a mounting screw, for instance a sheet metal screw and a retaining ring. The fastening device enables the communication terminal to be fastened particularly easily to an external element, for example a moving object, for example a container. The fastening device can be a detachable or non-detachable fastener of the communication terminal to the external element, depending on the use case. In the case of container locating, it is advisable for the fastener to be non-detachable, to prevent unauthorized removal of the communication terminal from the container.

In further embodiment, the communication terminal can comprise at least one photo cell. In the case of use of the communication terminal on a container, a photocell could be used to realize a door opening sensor, which, when installed in an overlapping manner on the end of the container, monitors the opening status of the door and transmits when an alarm is needed.

The communication terminal according to the invention has a number of advantages. First, it has a very long service life, for example due to the solar cell and the low energy consumption made possible by the locating concept. It also has a very advantageous location accuracy and location frequency. For example, locations can be determined every x hours with an accuracy of down to a few meters, even without visual contact with a satellite. The communication terminal has a very small design size, is of simple and thus economical design, and is easy to install. For example, an installation time of a few seconds can be realized through the use of an integrated, self-tapping and self-locking screw combined with a simple and compact, water-tight case. Furthermore, no communication costs are incurred for locating.

The locating method itself according to the invention likewise has not been known heretofore in this form. It is important to understand that this method does not involve the conventional triangulation/trilateration that can already be performed on communication terminals and then transmits the result of the location determination to a server. The solution according to the invention does not take place on a terminal, but rather centrally, on a system of the network operator. Alternatives hereto do already exist, for example locating by silent text, or by calling the terminal on a dedicated server that can read the location data from the type of number being called. Both methods have disadvantages, however, in terms of overall cost. Either costs are incurred through the use of communication channels, whether GSM or GPRS, or the location information is acquired by the terminal itself, for instance by detecting the incoming cell ID's or through the use of a GPS chip, and is determined to a central location, as a result of which higher hardware costs are incurred for each terminal and the energy consumption of the terminals increases, thus in turn resulting in an increase in hardware costs. Heretofore, there has been no known approach that locates a device exclusively centrally by having it deliberately dial into different cells, particularly while no change in location occurs, but not transmit any data in the process.

The present invention preferably involves the use of a central database which is, in particular, an APN register. The APN (Access Point Name) register, which can be, for example, the HLR (Home Location Register) in combination with a VLR (Visitor Location Register), preferably contains not only the information items relating to the particular network operator's own stations/radio masts, which must be used to establish a connection. On connection to a radio cell, the IMSI (consisting of the MNC, the MCC and the MSISDN of the phone itself) is stored in the APN to permit unambiguous identification of the mobile terminal on the individual device level. With regard to the abbreviations: MNC stands for "mobile network code" and
MCC stands for "mobile country code."

Whereas the MCC permits an initial assignment to the continent and the individual country, the MNC specifies which network is being used.

MSISDN stands for the Mobile Station Integrated Services Digital Network Number and represents the ID of the terminal or of the SIM card.

After the phone can be identified unambiguously in the overall network via the IMSI, the access location for the terminal is now deposited in the VLR/HLR database along with the IMSI (MNC, MCC and MSISDN). The following data are stored for this purpose, in addition to those already cited above:
1. The MSRN (Mobile Station Roaming Number). This, in turn, consists of the:
Visitor Country Code (VCC)
Visitor National Destination Code (VNDC)
Visitor Mobile Switching Center (VMSC)
Visitor Subscriber Number (VSN).
2. The Location Area Identity (LAI). This, in turn, consists of the:
Mobile Country Code (MCC) of the base station and defines the country in which the terminal is currently located
Mobile Network Code (MNC) of the base station and defines the network into which the terminal dialed most recently.
Location Area code (LAC) of the base station. This usually consists of a group of radio cells (BTS) and the individual cell ID that makes it possible to distinguish between the radio cells in a BTS, together with, in many cases (depending on the provider):
The antenna direction (here, the numerals '1', '2' and '3' are used to identify the relevant sector antenna among the BTS sector antennas, which usually each cover 120°, to permit
more precise localization in the cell) The mobile terminal is unambiguously assigned to a cell in this way. The conversion into address data or lat./long. coordinates is done by comparing the cell ID (ideally with additional information items such as the antenna used, the transmission strength or the TA values) by means of network-internal databases.

BRIEF DESCRIPTION OF THE DRAWINGS

The invention will now be described more closely on the basis of an exemplary embodiment and with reference to the accompanying drawings. Therein:

FIG. 1 illustrates a communication terminal 20 used in connection with the locating of containers 10.

Figure 1:
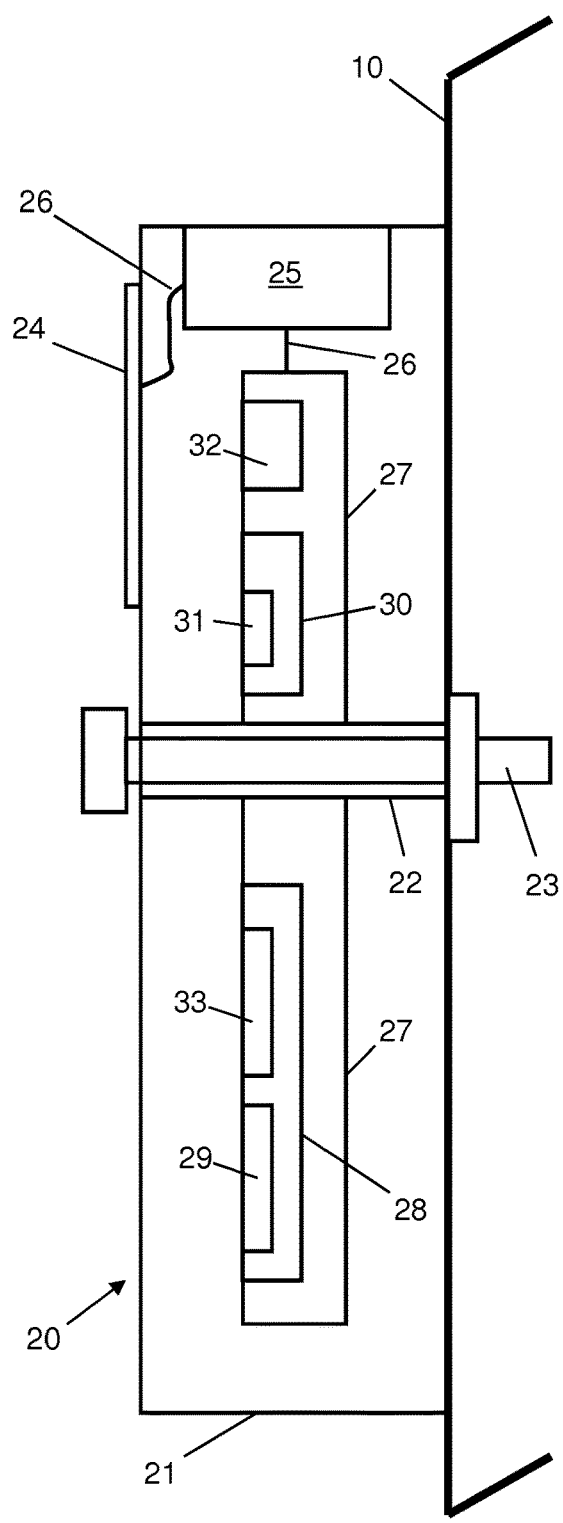
FIG. 1 shows an exemplary embodiment of a communication terminal according to the invention.

Here, the communication terminal 20 is in the form of a simple mobile phone and is assigned to a cellular communication network in the form of a mobile radio network.

The communication terminal 20 comprises, in the first place, a fully encapsulating, water-tight case 21 in which the majority of the components of the communication terminal are located. Via a sleeve 22 provided in the case, a fastening device in the form of a mounting screw 23 can be passed through. By means of the mounting screw 23, the communication terminal 20 can be fastened non-detachably to a wall of the container 10.

To generate the necessary electrical energy, provided outside the case 21 is at least one solar module 24, which is connected via a connecting cable 26 to a device for storing energy 25, for example a storage battery. The energy generated by the solar module 24 can thus be temporarily stored in the device for storing energy.

The individual components of the communication terminal 20 are disposed on a board 27 that is connected via a connecting cable 26 to the device 25 for storing energy.

In FIG. 1, the individual components are shown schematically on the board 27 for purposes of illustration. They can be electrical components or electrical circuits. Preferably, individual components can be in the form of software components, but they also can be part of the firmware of the communication terminal 20.

DETAILED DESCRIPTION OF THE PREFERRED EMBODIMENT

The communication terminal 20 comprises, first of all, a communication module 28 by means of which the communication terminal 20 is able to communicate with and within the communication network. The communication module 28 is provided with a connection establishing device 29, by means of which the communication terminal 20 can establish a connection to the radio cells of the communication network. The connection establishing device 29 also ensures that the communication terminal 20 maintains this connection to the particular radio cell for a defined time period, for example five seconds, after the connection is established, and that after the defined time period has elapsed, the communication terminal 20 terminates the connection to the particular radio cell, that is, is disconnected from it.

The communication terminal 20 further comprises a clock unit 30 in which a defined time interval is preset. The clock unit 30 is also provided with a triggering device 32 for generating a trigger signal. The trigger signal can be a signal for switching the mode of operation of the communication terminal 20. It is preferably provided that the communication terminal 20 is initially or basically in a ready mode. After a time interval has elapsed, that is, at the end of the time interval, a trigger signal is generated, in response to which the communication terminal 20 switches from ready mode into operating mode. In operating mode, the communication terminal 20 can perform the connection establishment procedures for connecting to the radio cells. If this is terminated, the communication terminal 20 is switched out of operating mode and back into ready mode. This takes place via a corresponding switching device 32. Finally, for purposes of authentication, the communication terminal 20 has an embedded SIM card 33.

The sequence of the locating method according to the invention will now be described with reference to FIGS. 2 to 5.

Figure 2:
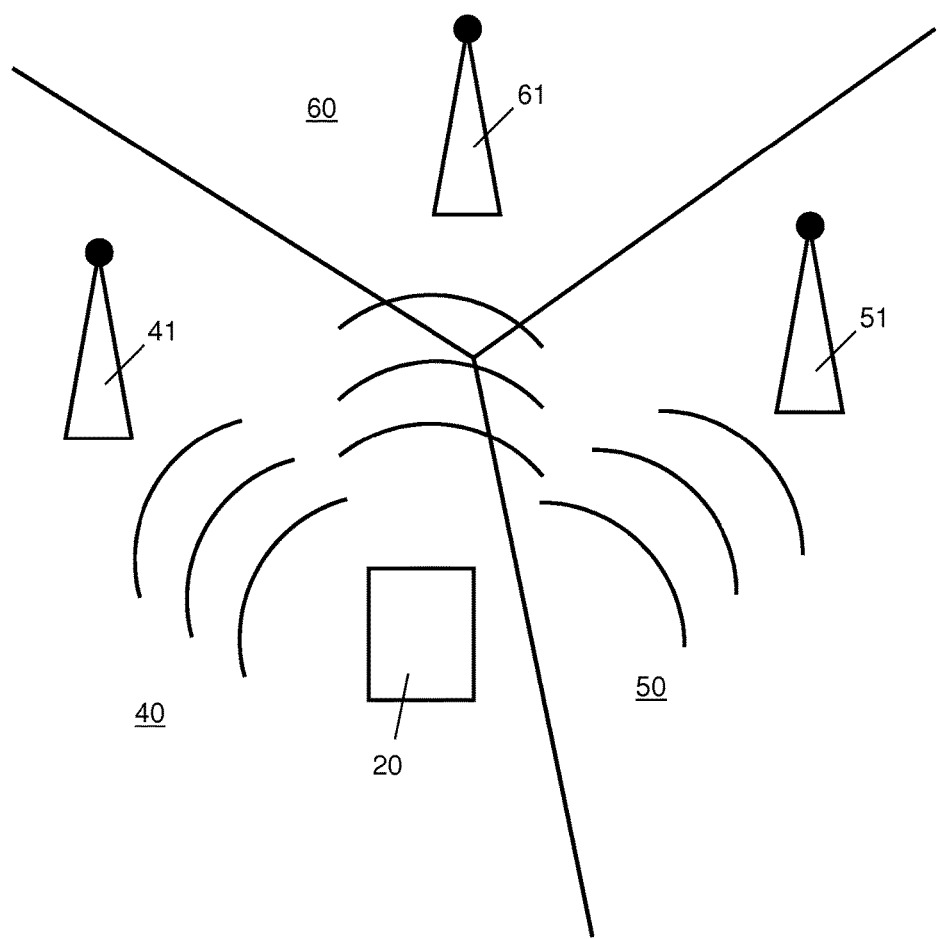
FIGS. 2 to 5 show the sequence of a method according to the invention for locating a communication terminal.
Figure 3:
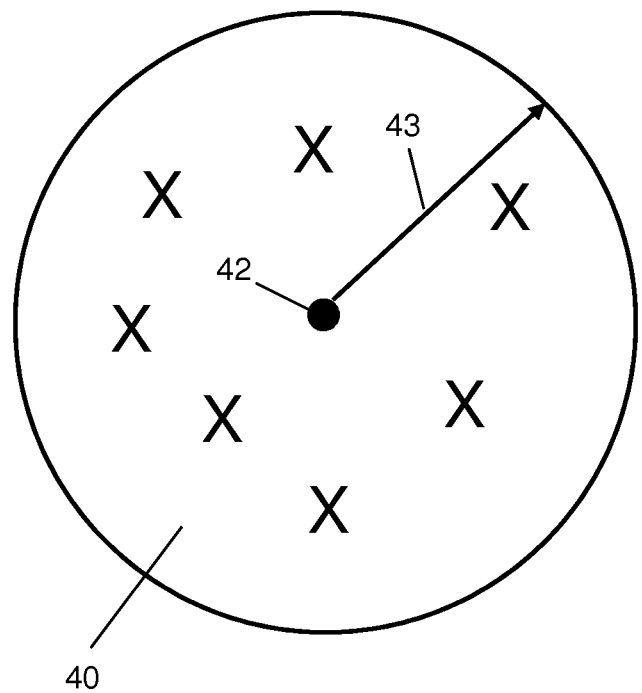

It is provided, for this purpose, that the communication terminal 20 successively establishes a connection to a number of radio cells having the same and/or different field strengths. FIG. 2 shows, for purposes of illustration, three radio cells 40, 50, 60. Each radio cell 40, 50, 60 has a base station 41, 51, 61 assigned to it. At the location of the communication terminal 20, the radio cells 40, 50, 60 have the same or different field strengths in relation to the communication terminal 20.

After the communication terminal 20 is switched out of ready mode into operating mode by the trigger signal after the lapse of a time interval, for example after 24 hours, the communication terminal 20 successively establishes a connection to the individual radio cells 40, 50, 60, first establishing a connection to the strongest radio cell 40. Radio cell 40 has a specific radio cell ID, which is stored on the network side in a central database that can be used by a network-side locating device. The information that the communication terminal 20 has established a connection to radio cell 40 can be converted into geographical latitude and longitude readings with the aid of the central database. The transmission field strength of radio cell 40 can also be determined with the aid of the central database. Viewed from a cell point 42 of radio cell 40 that is also, for example, the location of base station 41, and based on the position data 43 in the form of latitude and longitude readings, radio cell 40 can be located geographically, as illustrated for cell 40 in FIG. 3. A whole series of possible positions for the communication terminal 20 in radio cell 40 is obtained in this way; a few such positions are marked with an "X" in FIG. 3 for purposes of illustration.

Figure 4:
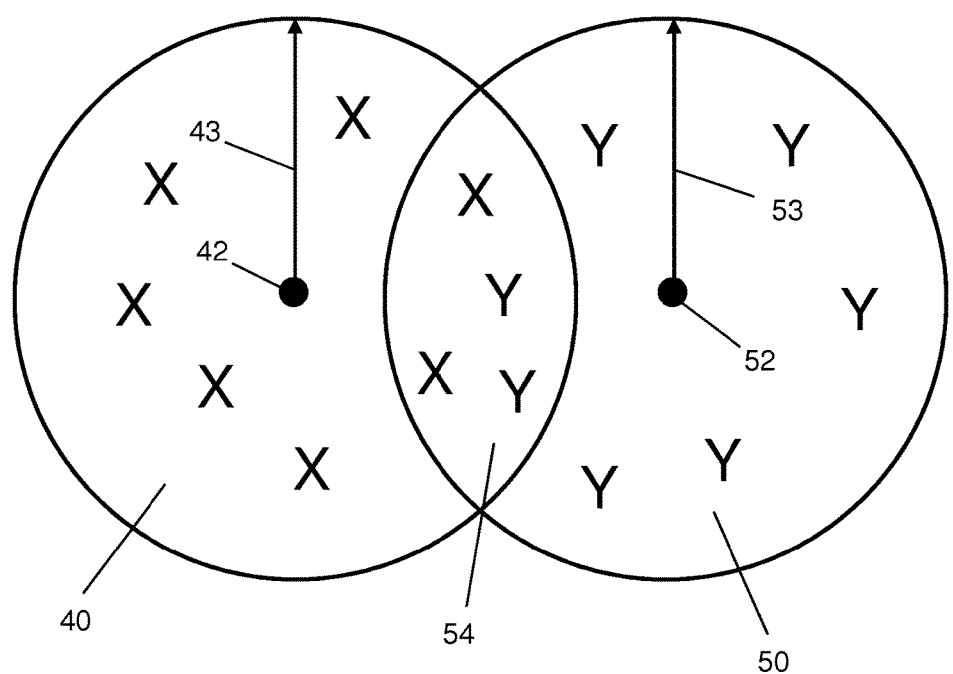

Five seconds after establishing a connection to radio cell 40, the communication terminal 20 is disconnected from radio cell 40 and in the same manner establishes a connection to the next radio cell 50, having a lower field strength, as illustrated in FIG. 4. The information items from the central database are, in turn, transmitted to the network-side locating device. The information that the communication terminal 20 has established a connection to radio cell 50 can, in turn, be converted into geographical latitude and longitude readings with the aid of the central database. The transmission field strength of radio cell 50 can also be determined with the aid of the central database. Viewed from a cell point 52 of radio cell 50 that is also, for example, the location of base station 51, and based on the position data 53 in the form of latitude and longitude readings, the radio cell 50 can also be located geographically. A whole series of possible positions for the communication terminal 20 in radio cell 50 is obtained in this way; a few such positions are marked with a "Y" in FIG. 4 for purposes of illustration.

Since the communication terminal has connected both to radio cell 40 and to radio cell 50, its possible position therefore has to be within the overlap region 54 of the two cells 40, 50.

Figure 5:
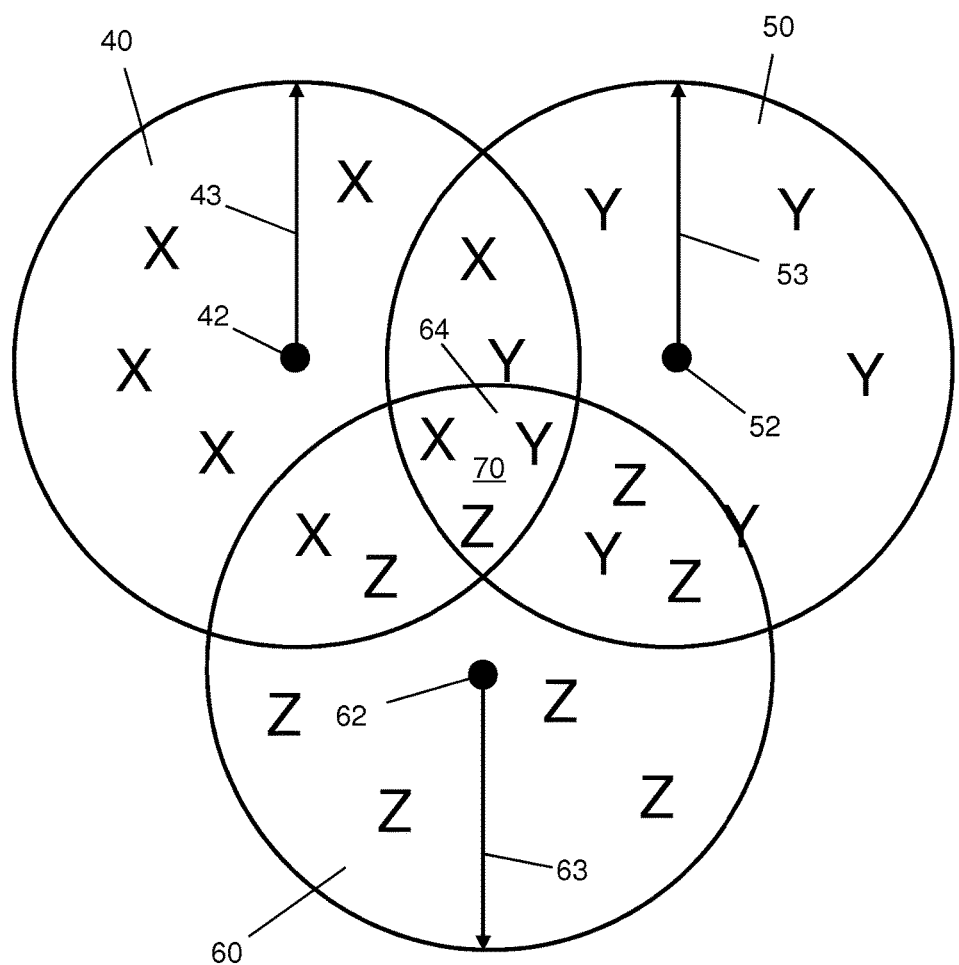

FIG. 5 illustrates that this process is repeated once again. Five seconds after establishing the connection to radio cell 50, the communication terminal 20 is disconnected from radio cell 50 and establishes in the same manner a connection to the next radio cell 60, having a still lower field strength. Once again, the information items are transmitted from the central database to the network-side locating device. The information that the communication terminal 20 has dialed into radio cell 60 can, in turn, be converted into geographical latitude and longitude readings with the aid of the central database. The transmission field strength of radio cell 60 can also be determined with the aid of the central database. Viewed from a cell point 62 of radio cell 60 that is also, for example, the location of base station 61, and based on the position data 63 in the form of latitude and longitude readings, radio cell 60 can also be located geographically. A whole series of possible positions for the communication terminal 20 in radio cell 60 is obtained in this way; a few such positions are marked with a "Z" in FIG. 5 for purposes of illustration.

Since the communication terminal has connected to radio cell 40 and to radio cell 50 and to radio cell 60, its possible position can therefore only be in the overlap region 64 of the three cells 40, 50, 60. The actual position 70 of the communication terminal 20 can thus be determined very precisely in this way.

As a suitable approximation, it can be assumed in any given case that the position is in the center of the respective radio cells 40, 50, 60 and in the center of the overlap regions 54, 64. Cost-neutral, centralized locating of the communication terminal 20 can take place in this way, since no chargeable data transmissions are engaged in during the method.

LIST OF REFERENCE CHARACTERS

10 Container
20 Communication terminal
21 Case
22 Sleeve for mounting screw
23 Fastening device (mounting screw)
24 Solar module
25 Device for storing energy (storage battery)
26 Connecting cable
27 Board
28 Communication module
29 Connection establishing device
30 Clock unit
31 Triggering device for generating a trigger signal
32 Switching device for switching from operating mode into ready mode
33 Embedded SIM card
40 Radio cell
41 Base station
42 Cell point
43 Position data (latitude, longitude reading)
50 Radio cell
51 Base station
52 Cell point
53 Position data (latitude, longitude reading)
54 Overlap region between cells 40 and 50
60 Radio cell
61 Base station
62 Cell point
63 Position data (latitude, longitude reading)
64 Overlap region between cells 40, 50 and 60
70 Located position of communication terminal
X Possible positions of communication terminal in cell 40
Y Possible positions of communication terminal in cell 50
Z Possible positions of communication terminal in cell 60

The invention claimed is:

1. A method for generating location data for locating a mobile communication terminal in a cellular communication network, said communication network being comprised of a number of radio cells, said method comprising that the communication terminal successively establishes a connection to a number of three or more radio cells having the same and/or different field strengths, that the communication terminal maintains the connection to a particular radio cell to which the communication terminal has established a communication for a defined time period, and that after the defined time period has elapsed, the communication terminal terminates the connection to the radio cell and establishes a connection to the next radio cell.

2. The method as set forth in claim 1, further comprising that the communication terminal, in establishing the connection to a radio cell, transmits an identifier of the communication terminal.

3. The method as set forth in claim 1, further comprising the following steps:
   a) the communication terminal is in a ready mode;
   b) after the lapse of a time interval that is set in a clock unit provided in the communication terminal, the communication terminal receives a trigger signal from the clock unit and switches from ready mode into operating mode;
   c) in operating mode, the communication terminal successively establishes a connection to the number of two or more radio cells having the same and/or different field strengths, and maintains the connection to the particular radio cell for a defined time period;
   d) after the defined time period has elapsed, the communication terminal terminates the connection to the radio cell and establishes the connection to the next radio cell;
   e) after termination of the connection to the last radio cell, the communication terminal switches from operating mode back into ready mode and remains in ready mode until the next time interval has elapsed.

4. The method as set forth in claim 1, further comprising that the communication terminal first establishes a connection to a first radio cell having the highest field strength, that after the defined time period has elapsed, the communication terminal terminates the connection to the first radio cell, and that the communication terminal then establishes a connection to at least one other radio cell whose field strength is equal to or weaker than that of the first radio cell.

5. The method as set forth in claim 1, further comprising that the communication terminal successively establishes a connection to a number of three or more, preferably in up to nine radio cells having the same and/or different field strengths.

6. The method as set forth in claim 1, further comprising that the time interval after the lapse of which the communication terminal switches out of the ready mode into an operating mode is on the order of one or more hours or on the order of one or more days.

7. The method as set forth in claim 1, further comprising that the communication terminal maintains an established connection to a radio cell for the defined time period of between 0.5 and 15 seconds, particularly between 2 and 10 seconds, preferably between 4 and 7 seconds, particularly preferably of 5 seconds.

8. The method as set forth in claim 1, further comprising that said method is performed while the communication terminal is in a stationary state.

9. The method according to claim 1 wherein each radio cell is assigned to a base station located at a defined location, wherein connection establishment procedures performed by a communication terminal to connect to a number of two or more radio cells having the same and/or different field strengths are detected successively on the network side, wherein after the establishment of a connection to a radio cell, an identifier of the communication terminal establishing the connection is linked on the network side to a radio cell ID of the radio cell, wherein at the instant of connection establishment and/or connection termination by the communication terminal to a radio cell, a time stamp is generated that is linked to the identifier of the communication terminal and to the radio cell ID to form location data, and in that the location data are stored in a central database on the network side.

10. The method as set forth in claim 9, further comprising that the connection establishment procedures for connecting to two or more radio cells having the same and/or different field strengths are detected at a defined time interval, and that the defined time interval is between 0.5 and 15 seconds, particularly between 2 and 10 seconds, preferably between 4 and 7 seconds, and particularly preferably is 5 seconds.

11. The method as set forth in claim 9, further comprising that on the network side, a connection establishment procedure performed by the communication terminal to connect to a first radio cell having the highest field strength is first detected, and in that a connection establishment procedure performed by the communication terminal to connect to at least one other radio cell whose field strength is equal to or weaker than that of the first radio cell is then detected.

12. The method as set forth in claim 9, further comprising that connection establishment procedures performed by a communication terminal to connect to a number of up to nine, radio cells of equal and/or different field strengths are successively detected.

13. The method as set forth in claim 9, further comprising that the radio cell IDs of the individual radio cells are linked to geographical position data, particularly to latitude and longitude readings.

14. The method as set forth in claim 9, further comprising that values relating to the field strength of a radio cell at the instant of connection establishment by the communication terminal to said radio cell are detected.

15. The method as set forth in claim 9, further comprising that the location data are stored on the network side in a central database configured as a central APN register.

16. The method according to claim 9, wherein locating a mobile communication terminal in a cellular communication network takes place on the network side by means of a locating device in such manner that the locating device accesses a central database of the communication network, in which central database the location data are stored, said location being stored in the form of identifiers of communication terminals establishing a connection to radio cells of the communication network, which are linked to radio cell IDs of the radio cell dialed into and to a time stamp at the instant of connection establishment and/or connection termination by the communication terminal to a radio cell, in that the location data for a communication terminal having a predefined identifier are used to determine radio cell IDs for which the time stamps fall within a defined timeframe, and in that the determined radio cell IDs are used to determine the position of the communication terminal.

17. The method as set forth in claim 16, further comprising that the locating device accesses a central database of the communication network, which central database is configured as a central APN register.

18. The method as set forth in claim 16, further comprising that for the communication terminal having a predefined identifier, radio cell IDs are determined for which the time stamps fall within a defined timeframe of less than 2 minutes, preferably within a timeframe of between 6 and 90 seconds, particularly preferably between 15 and 45 seconds.

19. The method as set forth in claim 16, further comprising that the location data for the communication terminal having a predefined identifier are first used to determine a radio cell ID of a first radio cell, particularly the radio cell with the highest field strength, and that from this are generated first location information items relating to the communication terminal, that the radio cell ID of at least one other radio cell, particularly a radio cell whose field strength is equal to or less than that of the first radio cell, is then determined and that from this are generated second location information items relating to the communication terminal, and that the second location information items are added to the first location information items.

20. The method as set forth in claim 16, further comprising that the locating device accesses a central database of the communication terminal, in which central database are deposited the location data generated by the establishment of a connection by a communication terminal to a number of two or more radio cells of equal and/or different field strengths, in that the communication terminal maintains the connection to the corresponding radio cell for a defined time period, that after the defined time period has elapsed, the communication terminal terminates the connection to the corresponding radio cell and establishes a connection to the next radio cell, that after the establishment of a connection to a radio cell, an identifier of the communication terminal establishing the connection is linked, particularly on the network side, to a radio cell ID of the radio cell, that at the instant of connection establishment and/or connection termination by the communication terminal, a time stamp is generated, which is linked to the identifier of the communication terminal and to the radio cell ID to form location data, that the location data of a first radio cell are used to generate first location information items relating to the communication terminal, and that at least one additional location information item relating to the communication terminal is generated from the location data of at least one additional radio cell and is added to the first location information item.

21. The method as set forth in claim 19, further comprising that the combined location information items relating to the communication terminal are used to identify an overlapping region, the position of the communication terminal being located in the overlap region.

22. The method as set forth in claim 16, further comprising that the location frequency of a communication terminal is on the order of one or more hours or on the order of one or more days.

23. A communication terminal for communication in a cellular communication network comprising a number of radio cells, said communication terminal comprising a device for generating electrical energy, a case, and a communication module for establishing a communication connection of the communication terminal to the radio cells of the communication network, said communication terminal further comprising a connection establishing device that is designed to enable the communication terminal to successively establish a connection to a number of three or more radio cells having the same and/or different field strengths, said communication terminal being adapted for maintaining the connection to the corresponding radio cell to which the communication terminal has established a communication for a defined time period, and after the defined time period has elapsed, for terminating the connection to the corresponding radio cell and for establishing a connection to the next radio cell.

24. The communication terminal as set forth in claim 23, further comprising that the communication terminal comprises a clock unit, that set in the clock unit is a time interval after the lapse of which the communication terminal switches in each case from a ready mode into an operating mode, and that the clock unit comprises a triggering device for generating a trigger signal at the end of the time interval, in response to which the communication terminal switches from the ready mode into the operating mode.

25. The communication terminal as set forth in claim 24, further comprising a switching device for switching the communication terminal from operating mode back into ready mode after the communication terminal dials out of the last radio cell.

26. The communication terminal as set forth in claim 23, further comprising that the device for generating electrical energy comprises at least one solar module and/or that the device for generating electrical energy comprises a device for storing electrical energy, particularly a storage battery.

27. The communication terminal as set forth in claim 23, further comprising that the communication terminal comprises a fastening device for fastening the communication terminal to an external element and/or in that the communication terminal comprises at least one photocell.

\* \* \* \* \*